United States Patent [19]

Bayorgeon et al.

[11] 4,207,681
[45] Jun. 17, 1980

[54] VEHICLE MEASURING BRIDGE

[75] Inventors: Jeffrey T. Bayorgeon, Milwaukee; Dirk J. van Dalen, Milton, both of Wis.; Pierre N. Legrand, Soumagne, Belgium

[73] Assignee: Applied Power Inc., Milwaukee, Wis.

[21] Appl. No.: 824,073

[22] Filed: Aug. 12, 1977

Related U.S. Application Data

[62] Division of Ser. No. 680,146, Apr. 26, 1976, Pat. No. 4,055,061.

[51] Int. Cl.² ............................ G01B 3/38; G01B 5/14
[52] U.S. Cl. ............................. 33/180 AT; 33/174 G; 33/174 L; 33/288
[58] Field of Search ............. 33/180 AT, 181 AT, 288, 33/174 G, 174 L, 1 M, 174 R

[56] References Cited

U.S. PATENT DOCUMENTS

| | | | |
|---|---|---|---|
| 2,798,296 | 7/1957 | Liskey | 33/288 |
| 2,853,794 | 9/1958 | Van Winkle | 33/180 AT X |
| 3,241,243 | 3/1966 | Speer | 33/1 M X |
| 3,330,043 | 7/1967 | Sonner | 33/174 G |
| 3,774,311 | 11/1973 | Stemple | 33/174 R |
| 3,805,396 | 4/1974 | Hunnicutt | 33/180 AT |
| 3,869,804 | 3/1975 | Friend | 33/288 |
| 4,058,903 | 11/1977 | Wilkerson | 33/180 AT X |

FOREIGN PATENT DOCUMENTS 1361170 7/1974 United Kingdom.

OTHER PUBLICATIONS

Brochure: Caroliner published by AB Samefa (dated Aug., 1974).

*Primary Examiner*—William D. Martin, Jr.
*Attorney, Agent, or Firm*—Robert L. Lindgren; Lloyd L. Zickert; Joseph A. Yanny

[57] ABSTRACT

An apparatus for reforming and straightening damaged bodies and frames of vehicles whereby corrective forces are applied to the vehicle through one or more elongated force transmission elements. A force is imposed on the elongated elements respectively by means of a uniquely mounted hydraulic ram which is freely pivotable sideways and limitedly pivotable in a backward direction. Each of the hydraulic rams are attached to a frame situated beneath the vehicle to be straightened whereby the frame further supports a measuring bridge coupled to the vehicle so that the progress of a straightening operation can be readily determined. The measuring bridge includes vertical indicators or gauges which are coupled at datum points on the vehicle so that an operator can readily determine the deformity of the vehicle longitudinally, laterally and vertically with respect to its center line. An operator can gauge the progress of the straightening operation in conjunction with target elements which indicate the ultimate degree of straightening necessary to reform the vehicle. The system thus permits a force to be applied to the vehicle in any desired direction or magnitude until such time as the measuring bridge indicates that the target dimensions have been reached providing a highly accurate and simplified technique of straightening and reforming vehicle bodies or frames.

11 Claims, 22 Drawing Figures

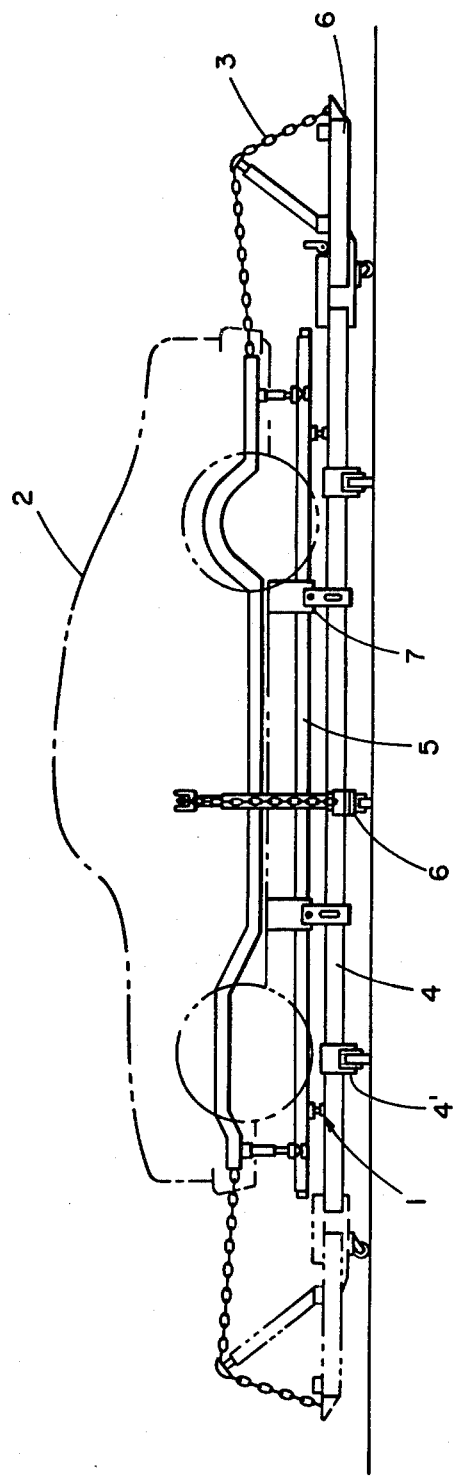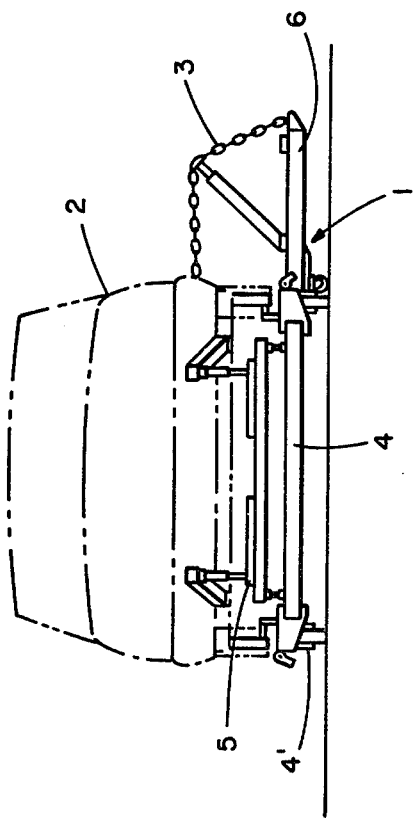

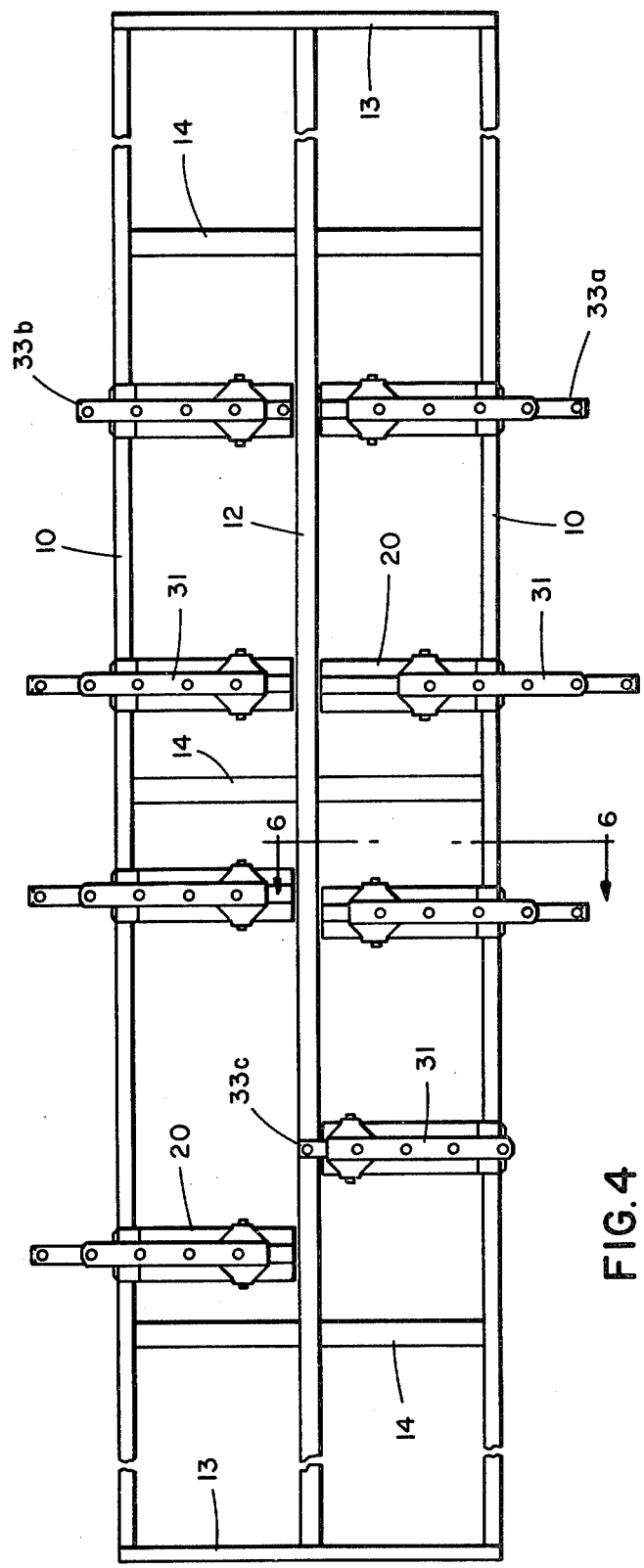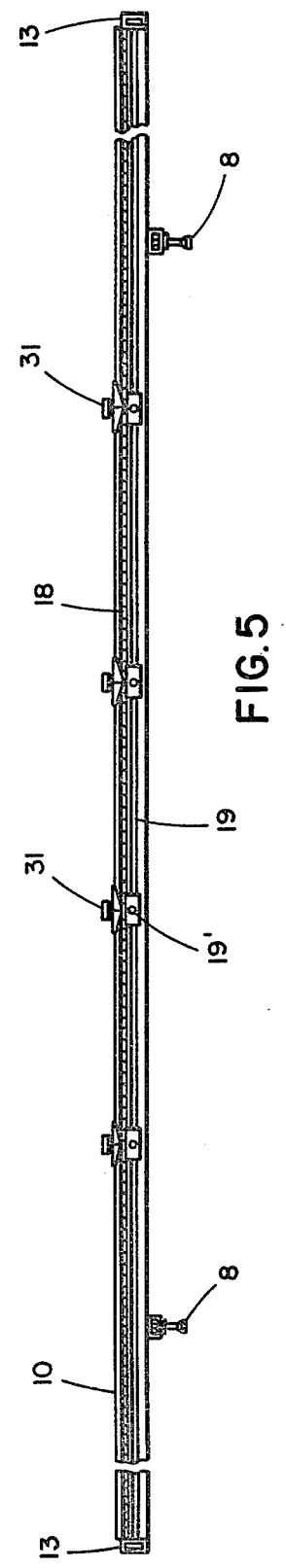

VEHICLE MEASURING BRIDGE

This is a division, of application Ser. No. 680,146 filed Apr. 26, 1976, now U.S. Pat. No. 4,055,061.

BACKGROUND OF THE INVENTION

This invention relates in general to force applying devices and in particular, to an improved apparatus for straightening and reforming vehicle bodies and frames.

More specifically, the invention relates to an apparatus for straightening and reforming vehicle bodies, frames and other parts of damaged or misaligned vehicles wherein the apparatus is positioned beneath a vehicle to be straightened and a frame of the apparatus supports one or more hydraulic rams which are adapted to apply a force of selected magnitude and direction to respective elongated force transmitting elements attached to the vehicle. The frame of the apparatus further supports a measuring bridge for proper orientation with respect to a vehicle to permit an efficient and accurate straightening operation to be achieved.

The measuring bridge includes a plurality of vehicle indicators or gauges which are adapted to be secured to datum points provided in the vehicle body at predetermined points by the vehicle manufacturer. The vertical indicators or gauges are telescopically extendable in a vertical direction and are supported on the measuring bridge for free movement both laterally and longitudinally of the vehicle in a plane substantially parallel thereto. Target indicators are provided on the measuring bridge and as one or more forces are applied to a vehicle, the vertical indicators move in response to the reformation of the vehicle. The apparatus of the invention indicates continuously at a glance whether the reference point to which each of the vertical indicators or gauge is attached has reached its respective target dimensions, longitudinally, laterally and vertically with respect to the longitudinal center line of the vehicle. The invention of the application thus provides an effective and efficient straightening appartus which achieves a high degree of accuracy in a significantly simplified technique.

Since vehicles often are involved in numerous disabling collisions causing deforming damage to their bodies and frames, it is desirable that effective techniques be utilized to straighten these vehicles for reasons of economy and safety. Many various types of frame straighteners have been provided in the prior art which rely on a multitude of techniques to accomplish reforming of the vehicle. Many of these prior art apparatus require considerable skill on the part of an operator which involves visual judgment and extensive experience to both apply the force and to determine whether the vehicle body has in fact been straightened to an accurate degree. The reliance on such visual judgment can not by its nature achieve the high degree of accuracy which is desirable for effective reforming and safety.

Other prior art devices have been introduced which possess some measuring capability to indicate whether the vehicle frame has been straightened to its original configuration. Such systems have not achieved satisfactory measuring capability to permit an operator to continuously apply a force with an indication of what reforming progress has actually been made and provide an indication of the ultimate straightening of the frame or body to its original symmetry.

Not only have the prior art devices failed to provide an operator with instantaneous and continuous indication of both progress in straightening and the ultimate achievement of reforming, many of the known straighteners have required extensive physical installations in garages or shops in order to provide straightening capability. These installations have proved to be expensive and undesirable in not permitting adaptability and movability which is advantageous in a repair shop environment. Thus, it is desirable in the prior art to provide an apparatus which accurately reforms and straightens vehicle frames and bodies by means which is simplified in design and achieves significantly improved results requiring a relatively minimum level of skill on the part of an operator.

SUMMARY OF THE INVENTION

It is, therefore, an object of this invention to improve the apparatus for straightening and reforming vehicle bodies and frames.

Another object of this invention is to apply a force to a vehicle body or frame in a wide range of directions to reform vehicles.

A further object of this invention is to couple a measuring bridge to the vehicle during a reforming and straightening operation to indicate the progress thereof.

Still another object of the invention is to provide a straightening apparatus with a measuring bridge which continuously indicates the progress of a straightening operation through measurement of the position of datum points in a longitudinal, lateral and vertical direction with respect to the center line of the vehicle.

A still further object of the invention is to improve the apparatus for straightening vehicles by providing a versatile and effective apparatus.

These and other objects are attained in accordance with the present invention wherein there is provided an improved apparatus for applying a force to a vehicle to straighten its frame or body after being deformed in a collision or other mishap. In general, the vehicle to be straightened is positioned over the apparatus of the invention whereby a frame thereof supports one or more hydraulic rams which when actuated extends to apply a force to a flexible force transmission element attached to one end to the vehicle and retained at its other end at a securement point. The frame of the invention is attached to the body of the vehicle at a plurality of points by means of suitable clamp mechanisms to secure the straightening apparatus in relation to the vehicle.

The frame further supports a novel measuring bridge which includes a plurality of vertical indicating devices or gauges adapted to be coupled to datum points on a vehicle. The gauges are capable of telescopically extending in a vertical direction and indicate vertical measurements of references points in the vehicle body relative to a datum plane. The vertical indicating gauges are supported on suitable means coupled to the measuring bridge for free movement in a direction longitudinally and laterally of the vehicle body in a parallel plane. Thus, as a force is applied to a vehicle, the movement of the vehicle body and frame in response to a straightening force carries the gauges in as many as three perpendicular directions, vertically, horizontally and laterally, relative to respective measuring scales. The movement of each of the plurality of vertical indicating gauges of the invention is independent of each other whether in a longitudinal, lateral or vertical direction. Such independent support of the gauges on either side of the longitudinal center line of the vehicle is an important aspect of the invention since in a normal undamaged condition, a vehicle is symmetrically designed by the manufacturer with respect to its center line. It is often encountered in deformation of frames and bodies that the symmetrical configuration of the vehicle on one side of the longitudinal centerline may be correct while the other side of the vehicle body is deformed. The independent mounting of the gauges permits proper orientation of the measuring bridge and improved straightening.

Each make of vehicle possesses its own unique symmetry and form so that in an undamaged and straightened condition, reference or datum points provided by the manufacturer should be situated at predetermined dimensions along its length, its width, and its height with respect to the vehicle center line. In a damaged condition, these datum points will deviate in one or more of these three directions and by attaching the gauges at that point, it is possible through the measuring system of the bridge to indicate the degree of deviation.

By reference to datum information of a particular model of vehicle being straightened, an operator can indicate where the particular datum point on the vehicle being connected to the gauges should be located and the measuring bridge of the invention provides a target whereby the correct position of the reference point vertically, longitudinally and laterally can be indicated. By then applying a corrective force in the proper direction, the vehicle has been reformed accurately when the gauges reach alignment with the three target indicators for each gauges. In most situations, it is necessary to attach a plurality of vertical gauges adaptors to selected datum points until each of the reference points indicates conformity with the target dimensions provided in the datum specification for a particular vehicle model.

In accordance with the operation of the apparatus of the invention, which will be explained in detail later in conjunction with the description of the preferred embodiment of this invention, it is possible to achieve accurate and simplified straightening of any type of vehicle model and return it to substantially its originally symmetrical form.

Not only is the invention capable of accurately reforming a vehicle frame or body through the use of the improved measuring bridge of the invention, the straightening apparatus further includes an improved ram means whereby more accurate and effective forces can be applied to the force transmitting element which is attached to the vehicle. Moreover, the frame or bench of the straightening apparatus of the invention is provided with means to support one or more rams at any location relative to the vehicle. To simplify the straightening operation, the assembly supporting the ram can readily be attached and detached from the frame by an improved latching mechanism. Similarly, the wheels supporting the frame for ready manipulation are detachable by an improved technique. The invention of the application is also provided with a ram mounting which limits the pivotable motion of the ram in one plane but provides free movement in a perpendicular plane. Such a mounting assembly greatly increases the versatility and efficiency of the straightening apparatus of the invention.

BRIEF DESCRIPTION OF THE DRAWINGS

Further objects of the invention, together with additional features contributing thereto and advantages accuring therefrom, will be apparent from the following description of an embodiment of the invention when read in conjunction with the accompanying drawings, wherein:

FIG. 1 is a side schematic illustration of the vehicle body and frame straightener of the invention in operative connection to a vehicle to be straightened;

FIG. 2 is an end schematic illustration of the vehicle body and frame straightener of FIG. 1;

FIG. 4 is a top view of the measuring bridge of the vehicle frame and body straightener of FIG. 1;

FIG. 5 is a side schematic illustration of the measuring bridge of FIG. 4;

DESCRIPTION OF THE PREFERRED EMBODIMENT

Figure 3:
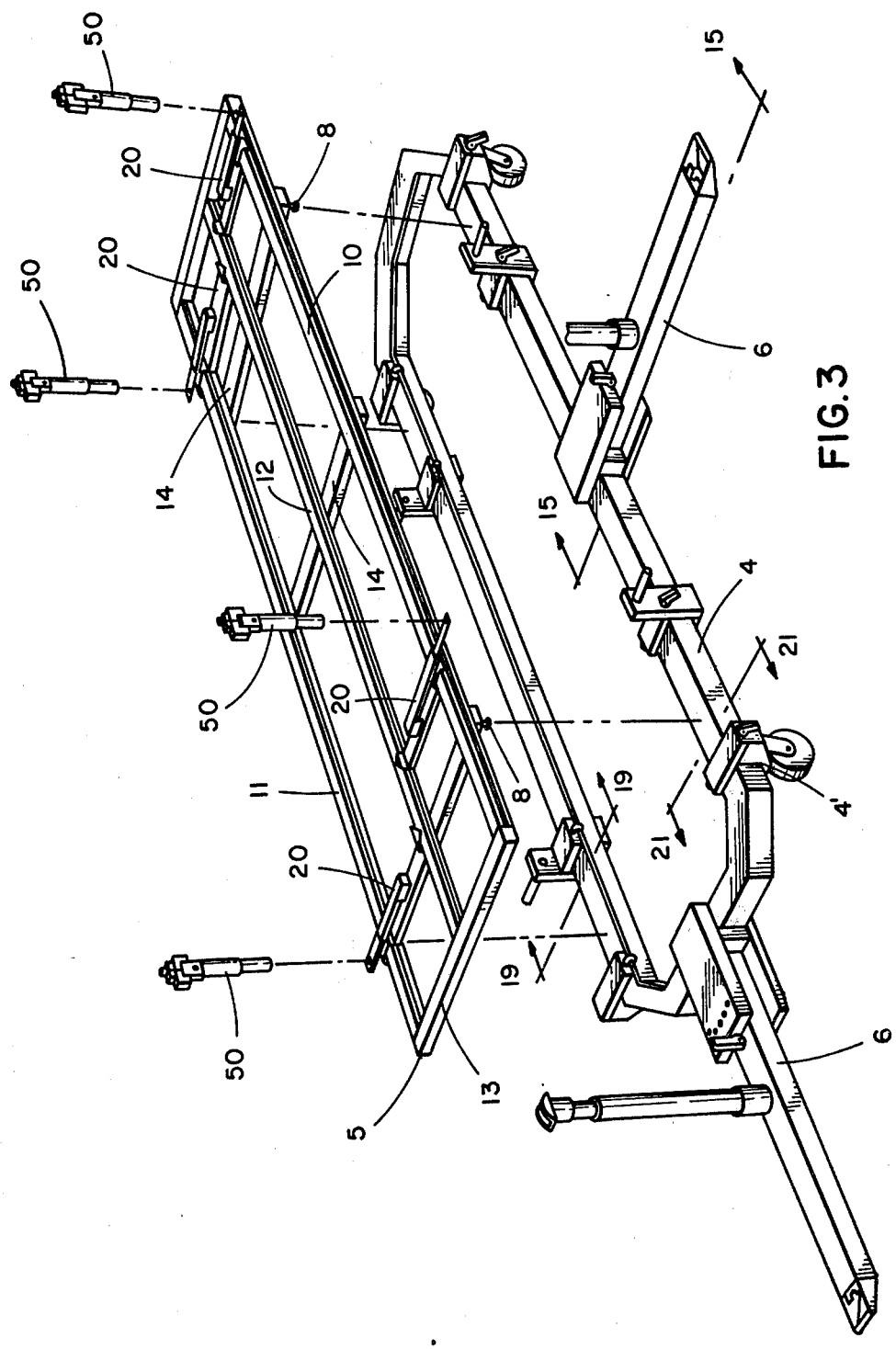
FIG. 3 is an exploded perspective illustration of the vehicle body and frame straightener of FIG. 1.

Referring to FIGS. 1 and 2 there is illustrated an embodiment of the vehicle body and frame straightener apparatus of the invention in operative connection to a vehicle for a straightening operation of its frame or body. The vehicle body and frame straightening apparatus 1 may be connected to a vehicle 2 shown in phantom which is is attached to straightener 1 by suitable clamp means (not shown) Straightener 1 applies a force to the vehicle through means of an elongated flexible force transmitting element 3 such as a chain or suitable element. Straightener 1 includes a frame 4 which rests on a support surface by a plurality of removable caster or roller assemblies 4' which can be located at any position on frame 4 and may comprise any number such as four assemblies as shown in the drawings. Frame 4 supports a measuring bridge 5 of the invention which is operatively coupled to the vehicle during a force applying operation. A force is applied to the vehicle through one or more force transmitting elements 3 by means of a respective removable force applying arm 6 which can be located at any position circumferentially around the frame for any direction of force application.

In FIG. 1 there is shown two force applying arms 6 being utilized in conjunction with the invention, but any number of force applying arms can be utilized simultaneously or sequentually depending on encountered conditions of the vehicle. As illustrated in FIG. 1, force applying arms can be attached to the frame in front, back or adjacent to each side and corner of the vehicle as desired. Frame 4 is coupled to the vehicle during a force applying operation by means of a clamp assembly 7 supporting a clamp of any suitable design which attaches frame 4 to the body or chassis of a vehicle 2 for proper operation. The specific structure and operation of each of the foregoing components of the vehicle body and frame straightener of the invention will be apparent from the following detailed description of each of these components.

Referring to FIGS. 1, 2, and 3 measuring bridge 5 is supported on the upper surface of frame 4 of straightening apparatus 1 by means of independently adjustable supports 8 affixed to the measuring bridge. The adjustable supports provide a threadedly operated mechanism to vary the orientation of the bridge with respect to the vehicle, a necessary operation for proper alignment between bridge 5 and the vehicle. Although four such adjustable leveling legs 8 are shown coupled to the measuring bridge, any number of such devices can be utilized to conjunction with the invention if desired.

Figure 6:
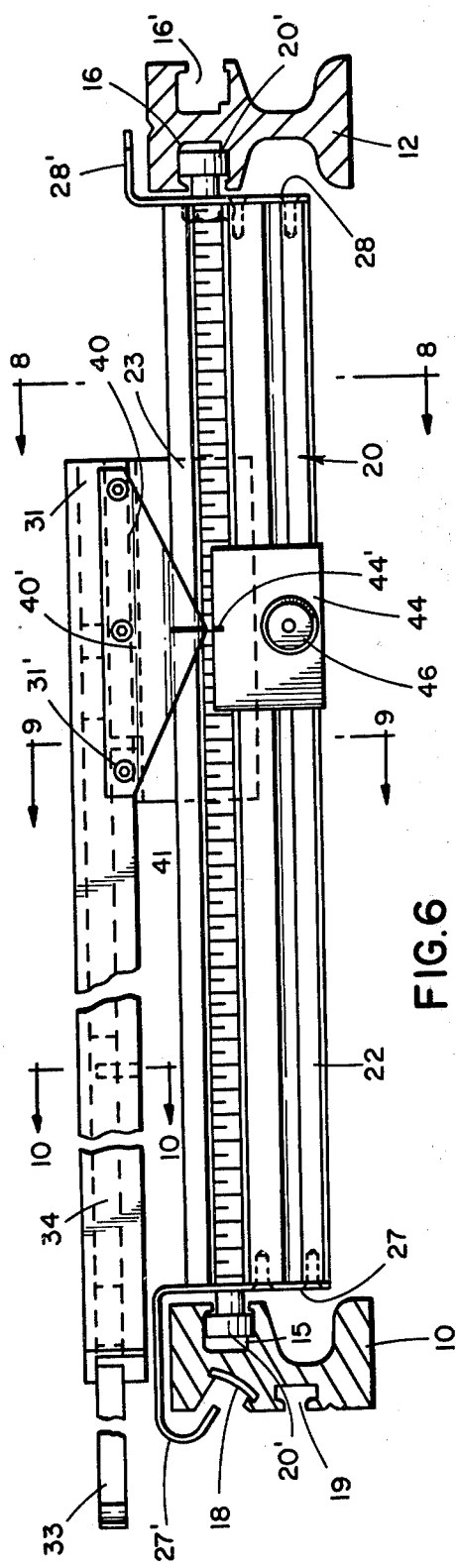
FIG. 6 is an end schematic illustration taken along line 6—6 of FIG. 4 with parts in section showing one of the cross slide assemblies of the measuring bridge of FIG. 4.

As best shown in FIGS. 3, 4 and 5 the measuring bridge 5 comprises a pair of outside elongated track members 10 and 11 lying in parallel relationship to each other. A middle track member 12 is situated in parallel relationshp between tracks 10 and 11. The tracks are maintained in parallel relationship by means of two end braces 13 and a suitable number of intermediate braces 14 which are attached by any convenient technique to the under surface of tracks 10, 11 and 12. Referring to FIG. 6, the cross sectional configuration of track 10 and center track 12 is illustrated. In regard to the cross sectional configuration of track 11, it should be noted that it is correspondingly opposite in form as cross track 10. A longitudinal groove 15 is formed in the inner side surface of track 10 and a corresponding longitudinal grooves 16 and 16' are formed on each side of track 12 whereby the two grooves lie in substantially the same plane and are adapted to receive rollers 20' of a series of cross or lateral slide assemblies 20 which span the separation between track 10 or track 11 and the center track 12. Any number of cross slide assemblies can be utilized in conjunction with the measuring bridge of the invention and it has been found advantageous to provide eight such assemblies situated in selected numbers on each side of center track 12. As best shown in FIGS. 5 and 6 tracks 10 and 11 each include a groove 18 (groove 18 on track 11 not shown) on their upper outside surface which receives a linear scale indicating dimensions along the longitudinal axis of the track. A second lower outside groove 19 is provided in both tracks 10 and 11 to receive a plurality of target indicators 19' (FIG. 4) which can be adjustably secured in the grooves to indicate target longitudinal dimensions of a vehicle model as will be explained in detail later.

Figure 7:
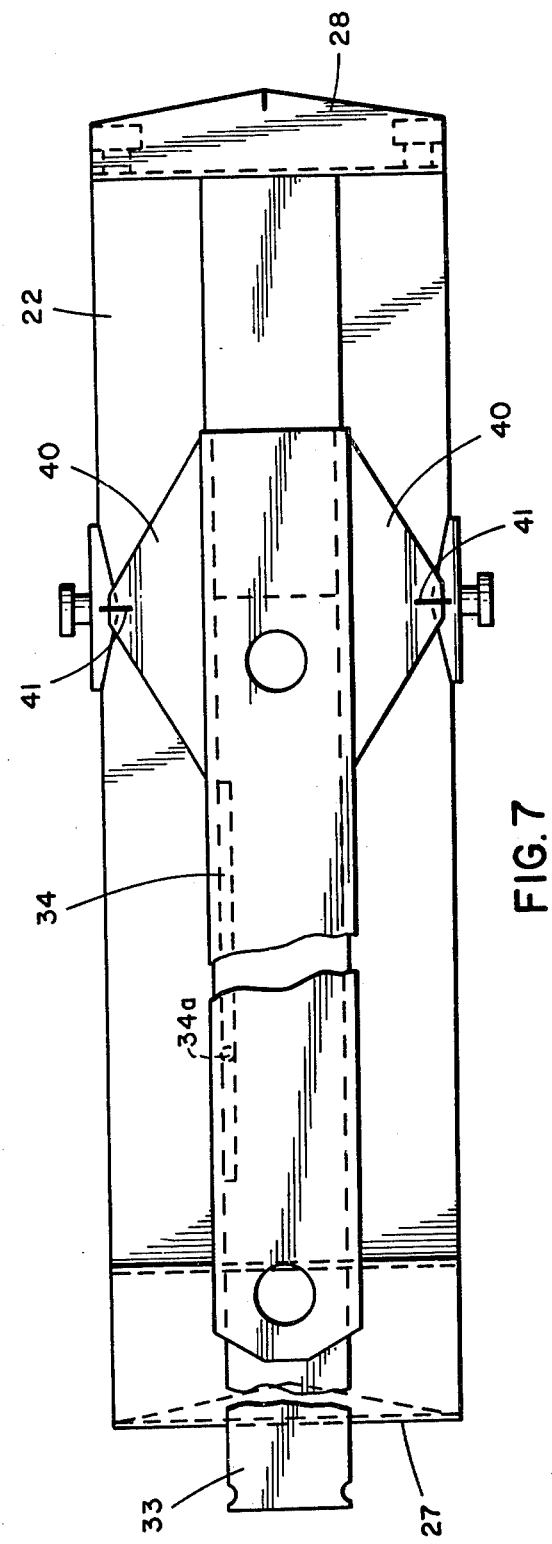
FIG. 7 is a top schematic illustration of the cross slide assembly of the measuring bridge shown in FIG. 6.
Figure 8:
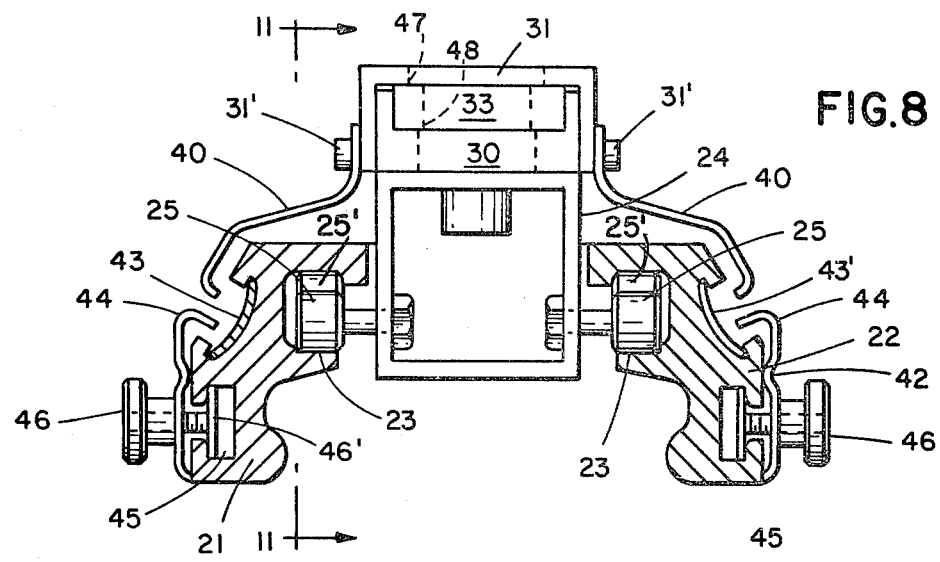
FIG. 8 is an end schematic illustration with parts in section of the cross slide assembly of the measuring bridge taken along lines 8—8 of FIG. 6.

It should be apparent that the movement of the cross slide assemblies 20 between track 10 and center track 12 is totally independent of the movement of assemblies between track 11 and center track 12. Referring to FIGS. 6, 7, 8, 9, 10 and 11 the construction of one of the cross slide assemblies 20 is clearly illustrated. Cross slide assembly 20 comprises a pair of spaced cross tracks 21 and 22 as best seen in FIG. 8 which include inner side elongated grooves 23 lying in confrontation to each other to receive a slide measuring assembly which is adapted to be movable laterally of the measuring bridge. The slide measuring assembly includes a carriage 24 having a set of rollers 25 and 25' of the same diameter attached to each side thereof whereby the rollers permit the carriage to freely move within grooves 23 of lateral tracks 21 and 22. Rollers 25 contact the bottom of 23 and rollers 25' are spring biased in contact with the top of the track.

The ends of cross tracks 21 and 22 are retained to form a unitary structure by means of a pair of plates or shields 27 and 28 (FIG. 6) suitably attached to the ends of each of the tracks 21 and 22 by any fastening means such as screws and the like. Shields 27 and 28 not only provide rigidity to the cross slide assembly but include hoods 27' and 28' which include an indicator to respectively indicate the longitudinal position of the assembly 20 relative to the scale in groove 18 and lateral alignment of two lateral slide assemblies aiding in determining proper straightening of a vehicle. The hoods of shields 27 and 28 are bent from and project out of the plane of the shields.

Figures 9, 10:
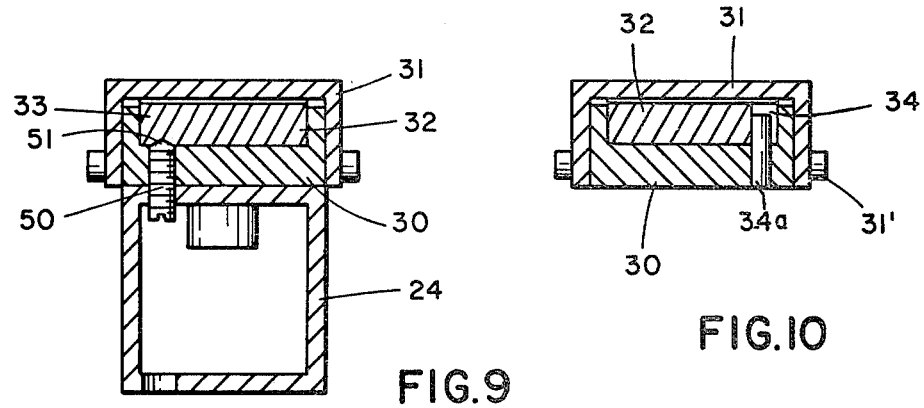
FIG. 9 is an end sectional view of the measuring slide of the cross slide assembly taken along lines 9—9 of FIG. 6.
FIG. 10 is an end sectional illustration of the measuring slide of the cross slide assembly taken along lines 10—10 of FIG. 6.
Figure 11:
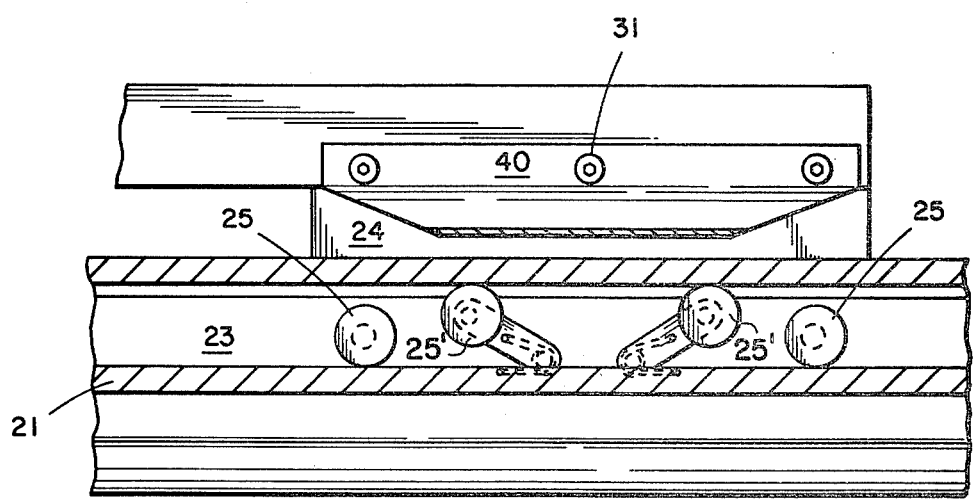
FIG. 11 is a partial side illustration with parts in section of the cross slide assembly taken along lines 11—11 of FIG. 8.

As best shown in FIGS. 8, 9 and 10 carriage 24 is formed as a rectangular tubular member and supports a measuring slide channel 30 on its upper surface which is attached to the carriage by any suitable attachment means. Channel 30 is U-shaped in construction and a main measuring slide 31 having a similar cross sectional construction fits over the top of carriage 24 in reversed relationship and is retained thereto by means of a series of screws 31'. Main measuring slide 31 and channel 30 projects laterally out of carriage 24 and are of a length slightly smaller than the length of lateral tracks 21 and 22 as seen in FIGS. 6 and 7. An extensible measuring slide 33 is telescopically mounted within channel 30 and slide 31 and is of the length slightly greater than slide 31 and channel 30.

The extensible measuring slide 33 is utilized to laterally extend the capability of the measuring bridge 5 a selected lateral dimension to accommodate larger vehicles. In operation where extensibility is not needed the slide 33 is telescoped further back within channel 30 and main measuring slide 31. Both positions of the extensible slide 33 are illustrated in FIG. 4 as slides 33a and 33b respectively. In addition, extensible slide 33 is capable of alignment of its inner end beneath the center line of a vehicle as shown as slide 33c in FIG. 4 since certain vehicles possess datum points in alignment with its center line.

The movement of the extensible measuring slide is controlled by means of a slot 34 formed in the side of slide 33 as best shown in FIGS. 6, 7 and 10. A pin 34a extends upwardly through channel 30 into slot 34 whereby the ends of slot 34 limit the outward and inward slidability of extensible slide 33.

From the foregoing description, it should be apparent that the main measuring slide assembly 31 is capable of movement longitudinally of tracks 10, 11 and 12 and movement laterally of bridge 5 on tracks 21 and 22. In addition, the extensible slide 33 is capable of limited telescopic movement relative to main measuring slide 31 and channel 30. The main measuring slide 31 supports on its two side surfaces a pair of opposite indicator plates 40 by means of a selected number of screws 31' and possess a triangular shape having at its apex an indicator line 41 as best shown in FIGS. 6 and 7. It is apparent that as channel 30 carrying slides 31 and 33 is moved in a lateral direction, the measuring plate 40 is carried therealong in an indication of the position thereof. A groove 43 extending longitudinally along the tracks 21 and 22 beneath plates 40 is adapted to carry a linear measurement scale indicating lateral dimensions relative to the center line of the vehicle.

As shown in FIGS. 6 and 8 a pair of opposite target plates or indicators 44 having an upper target indicator line 44' are slidably mounted within a groove 45 provided in the lower outside surface of cross tracks 21 and 22, respectively. The indicator plate is coupled to groove 45 by means of a threaded shaft 46 which extends through measuring target plate 44 whereby a washer element 46' can secure the plate in stationary position anywhere along the extent of cross slides 21 and 22 by tightening a shaft 46. When properly positioned, the stationary indicator line 44' acts as a target line for reasons to be described in conjunction with the description of the operation of the device.

The upper surface of both main measuring slide 31 and extensible measuring slide 33 possess a series of openings 47 and 48 (FIG. 8) respectively which are adapted to receive a respective vertical measuring adaptor indicator or gauge 50 (FIGS. 12 and 13) which is coupled to a datum point on the vehicle body. The vertical gauge serves to measure the vertical distance between the bridge and the vehicle body and particularly the vertical distance between the bridge and a datum point to which the gauge is connected. Each of the openings 47 of the main slide 31 are situated along its upper surface at fixed predetermined increments of spacing. Openings 48 of extensible slide 33 also extend through the slide and are spaced laterally at the same increments as openings 47. The openings 47 of main slide 31 are larger in diameter than the openings 48 and the bottom diameter of adaptor 50 whereby openings 48 of the slide 33 retain the adaptor in position on the measuring bridge. Thus, if any of the openings 47 are to receive a vertical measuring adaptor, then it is necessary for openings 47 to be in alignment with openings 48. To accomplish such alignment, a threaded shaft 35 extends through a wall of carriage 24 and carries a ball bearing 36 at its end as shown in FIG. 9. A notch 37 is provided in the bottom of extensible slide 33 and as ball 36 engages notch 37, proper alignment of openings 47 and 48 are automatically and releasably attained. As stated previously, extensible slide 33 is capable of movement to place the inner end thereof beneath the center line of the vehicle. Thus, the innermost opening 48 of slide 33 is alignable with the vehicle center line as shown in FIG. 4 as slide 33c.

The bottom portion of each of the vertical gauges 50 includes a tubular member 52 having a closed bottom end 53 and an internal passage 54. The lower end of the gauge is provided with an exterior stop 55 and an end portion 56 which passes through opening 48 of the slide 33. An expandable O-ring 57 is carried by the lower portion 56 in a grooved area whereby the O-ring secures the gauge in a vertical position in any of the openings 48 in extensible measuring slide 33. The tubular lower portion 52 telescopically receives a plunger 60 at its upper end. The plunger 60 is retained on lower portion 52 by means of a pin 61 which is positioned within an elongated vertical slot 62 provided in plunger 60. The end of pin 61 is retained to lower portion 52 and thus it should be clear that the plunger 60 is movable with respect to portion 52 determined by the extent of the elongated slot 62. A compression spring 63 is interposed within plunger 60 and lower tubular member 52 to urge the plunger 60 upward to maintain it into a biased contact with a vehicle to which the gauge 50 is secured.

Figure 12:
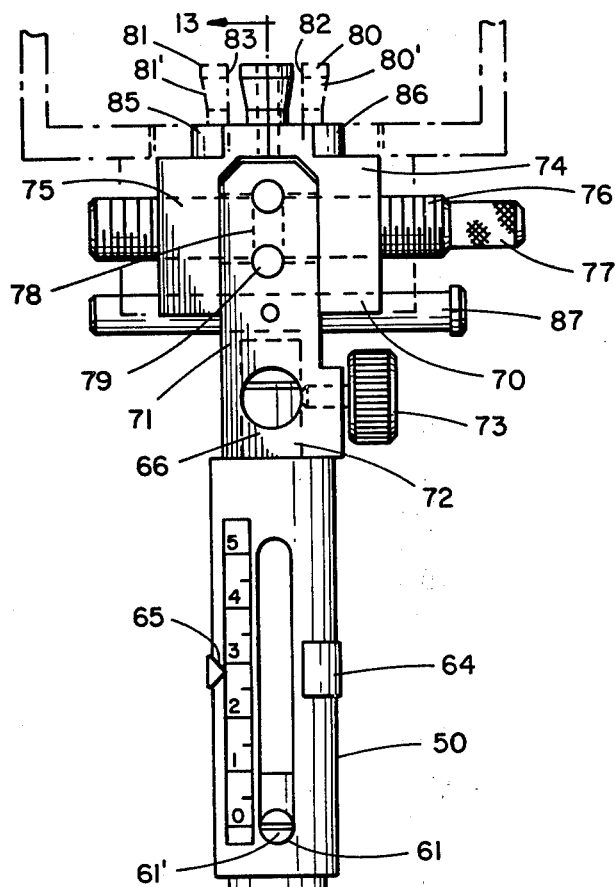
FIG. 12 is a side schematic illustration of a vertical indicating device or gauge of the measuring bridge of the frame straightener of FIG. 1.
Figure 13:
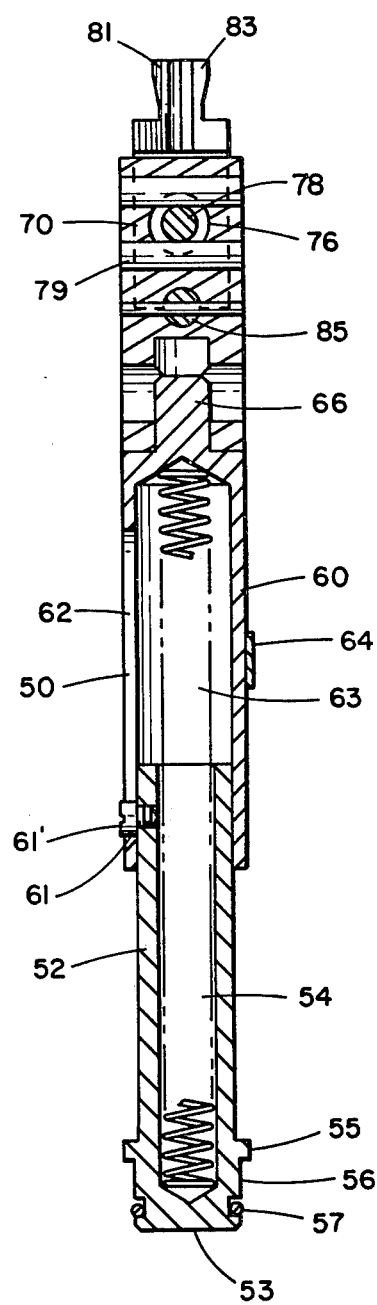
FIG. 13 is a section illustration of the vertical gauge of FIG. 12 taken along lines 13—13 thereof.

As best shown in FIG. 12, the slot 61' of the head of pin 61 acts as an indicator line in conjunction with a vertical scale suitably affixed in parallel relation to slot 62. Thus, the vertical scale of the gauge provides a means to indicate the relative height between the datum point to which the plunger 60 is connected and the measuring bridge 5. To provide a vertical target element a partial ring 64 is slidably mounted around the exterior of plunger 60 and includes a pointer 65 which can be utilized as a target point for vertical indication. Thus, ring 64 can be movable on the plunger to a desired position as a target indicator in conjunction with the straightening operation.

The upper portion of plunger 60 includes a reduced diameter projection 66 which is adapted to receive a connector assembly 70 which couples the vertical measuring gauge to the vehicle body at a selected reference hole or datum point. The connector assembly 70 includes a body 71 having a bottom hole 72 to receive the end of projection 66 of plunger 60. The adaptor is retained in fixed relationship on the plunger 60 by means of a screw assembly 73 extending into the hole 72 whereby the screw assembly is threaded and rotation of the knob thereof contacts the plunger in frictional tightened relationship. Body 71 acts to support a pair of jaws 74 and 75 which are coupled to the body by means of a horizontal threaded shaft 76 having a serrated end 77 to permit rotatable manipulation of the shaft in either direction. Shaft 76 passes through corresponding holes in both jaws 74 and 75 which are situated on opposite sides of body 71.

Figure 14:
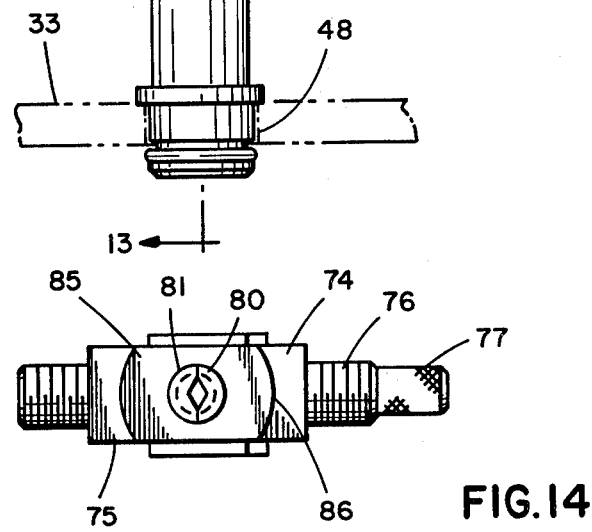
FIG. 14 is a top schematic illustration of the vertical gauge of FIG. 12.

Shaft 76 is restrained against lateral movement relative to the body means by means of a circumferential groove 78 formed in the intermediate portion of the screw and receiving a pair of pins 79 which are suitably supported in a groove within the body above and below shaft 76, respectively. Thus, threaded shaft 76 is capable of being rotated in either direction but is restrained against movement laterally of body 71. Jaws 74 and 75 are threadedly attached to shaft 76 such that upon rotation of shaft 76, jaws 74 and 75 are capable of movement toward or away from body 71 dependent on the direction of rotation of shaft 76. The upper portion of jaws 75 and 76 each have a semi-circular projection 80 and 81 with corresponding angular disposed surfaces 80' and 81' and planar inner surfaces 82 and 83 which are capable of abutting each other. When it is desirable to separate jaws 74 and 75, rotation of shaft 76 in the proper direction causes semi-circular projection 80 and 81 to separate. This capability of separation permits the gauge assembly of the invention to be attached to datum holes having a various range of diameters dependent on the vehicle model. It should also be noted that jaws 74 and 75 have a lower semi-circular surface 85 and 86 which also can be adapted for attachment to vehicle datum holes if necessary for securement of the vertical gauge. The inside of the jaws 80 and 81 upper portion form a diamond shaped opening as seen in FIG. 14 capable of securing the gauge to a protrusion such as a bolt or bolt head or nut which are also used as datum location. The hole in the side of the gauge is used to place the gauge on projection 66 for measuring locations in vertical surfaces. To act as a stop for outward movement of jaws 74 and 75, a pin 85 having at least one enlarged end extends through the lower portions of jaws 74 and 75 and through body 71. From the foregoing description, it should be apparent that when the lower end of the gauge 50 is attached to measuring slides 31 or 33 of a cross slide assembly and the upper end of the gauge is connected to a vehicle datum hole or point, spring 54 maintains the vertical gauge in contact with the vehicle despite movement of the vehicle in a vertical direction in accordance with the application of a straightening force to provide an automatic measuring of the distance between the bridge and the datum point during straightening procedures. Various extenders of predetermined lengths are also part of the system to allow measurement of points at various heights.

Referring now to FIGS. 15, 16, 17 and 18, there is illustrated one of the force applying arm assemblies 6 which is adapted to be coupled at any location on frame 4 at the front, rear, side or corner of a vehicle. The straightening apparatus of the invention is designed to utilize one or more arm assemblies to apply forces in various directions to overcome the infinite number of vehicle body and frame deformation problems which can be encountered. Force applying arm assembly 6 possesses an arm 100 which is at one end attached to the frame 4 of the vehicle straightening apparatus 1 by a hinge assembly 101. Hinge, assembly 101 includes a member having an upper body portion 102 integrally coupled to a lower body 103 which forms an arm receiving opening 104. Arm 100 is swivelly mounted within arm receiving opening 104 by means of a vertical swivel pin 105 passing upward through a hole 105' in lower body portion 103 and a corresponding hole in arm 100 and portion 102. The mounting of arm 100 by pin 105 permits the arm 100 to pivotally move in a plane lying perpendicular the longitudinal axis of pin 105.

Arm 100 is capable of being retained in any desired angular position with respect to the hinge assembly by means of a series of matching holes 109 which are provided in upper portion 102 and lower portion 103 along a common radius. A single hole (not shown) is provided within arm 100 and this hole can be aligned with a selected one of holes 109 to secure the arm at a desired angle with respect to frame 4. A removable shaft 110 can be selectively inserted through the selected hole in upper portion 102, through arm 100 and into lower portion 103 to effectively retain the arm in the angular position. Such capability to angularly orient the arm 100 increases the versatility of the direction of force application to a vehicle being straightened.

Figure 15:
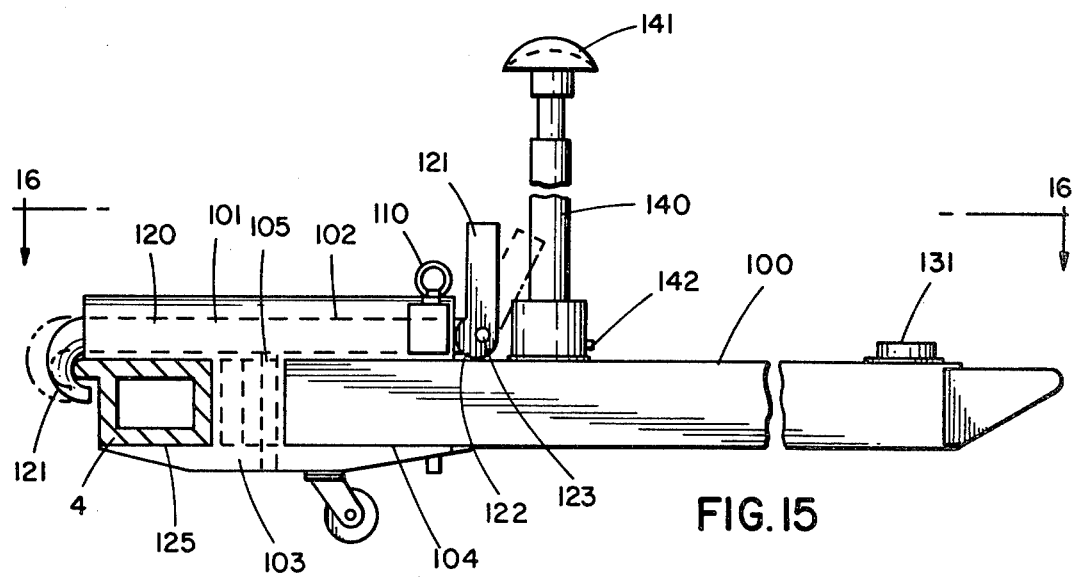
FIG. 15 is a side schematic illustration with parts in section of one of the force applying arms of the invention taken along lines 15—15 of FIG. 3.
Figure 16:
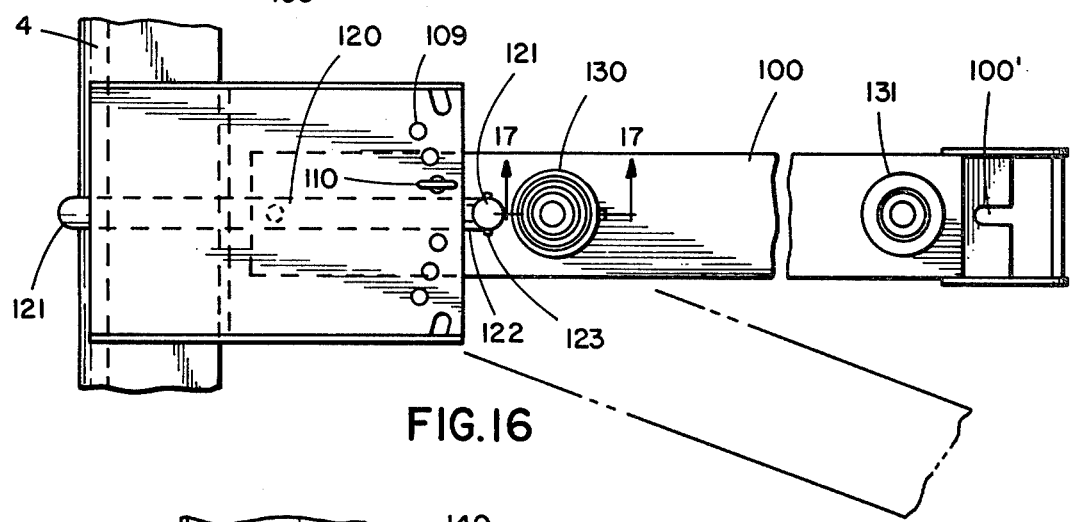
FIG. 16 is a partial top schematic illustration of a force applying arm of the invention taken along lines 16—16 of FIG. 15.

The hinge assembly 101 is attached to frame 4 by means of a hooked end rod 120 having a hook 120a at one end and a fixedly mounted cam mechanism at the other end. The cam mechanism comprises a lever 121 which has a spaced pair of integrally attached, double cam surfaces 122 formed thereon. The cam lever is secured to rod 120 by a horizontal pin 123 and rod 120 extends through a passage in upper portion 102 of the hinge assembly. In FIG. 15, lever 120 is shown in an upright position wherein both cam surfaces 123 are biased against a face of upper portion 102 of the hinge assembly and secure hook 121 over a flange formed on frame 4 of straightener 1. To remove hook 20a from securement to the frame, rotation of the shaft 120 to a position shown in phantom in FIG. 15 releases hook 120a from securement to frame 4 and the rod 120 can be easily rotated around its longitudinal axis to permit removal of arm assembly. As aid in securement to the frame, it should be noted the portions 102 and 103 of the hinge assembly include an area 125 which embraces frame 4 for suitable support. To attach an arm assembly to the frame, hook 120a can be swung down and lever 121 rotated to an up-right position to engage the hook on the flange of frame 4 for securement.

Figures 17, 18:
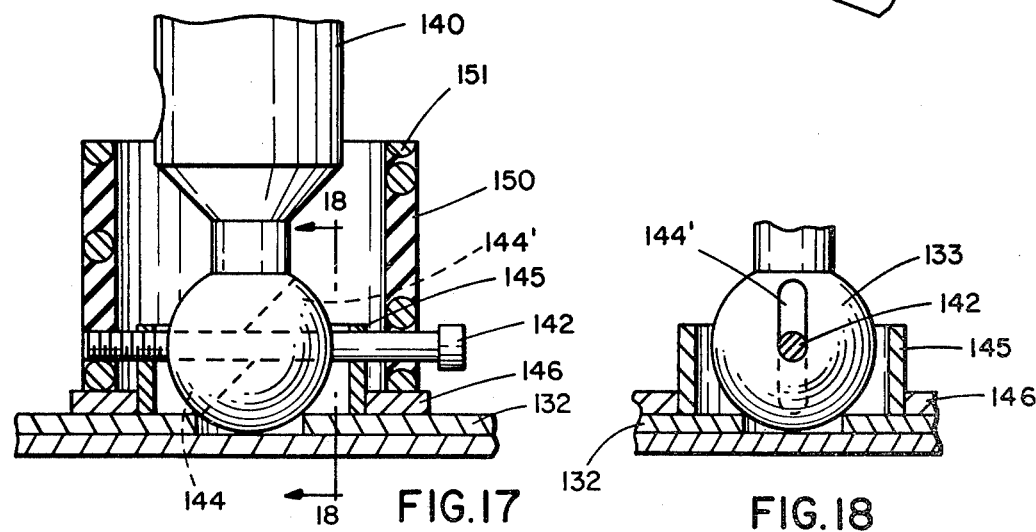
FIG. 17 is a partial sectional illustration of the ball and socket support of the ram assembly mounted on the force applying arm taken along line 17—17 of FIG. 16.
FIG. 18 is a partial sectional illustration of the ram assembly mounting taken along lines 18—18 of FIG. 17.

The force applying arm assembly 100 of the invention is provided on its upper surface with two ram support mountings 130 and 131 which are identical in construction. The provision of two such ram support mountings permits the ram to be supported at different positions on the arm to modify the application of force to a vehicle and provide greater versatility. The arm includes suitably attached layer 132 as best shown in FIGS. 17 and 18 which includes a hole to receive the bottom portion of a ball joint 133 of a ram. The ram 140 to be supported in either of the mountings 130 and 131 is a special ram which includes an end 141 extendable under the application of hydraulic pressure from a suitable supply. As end 141 is extended, force is applied to an elongated element 3 coupled at one end to a vehicle as shown in FIGS. 1 and 2 and at the other end to chain securement slot 100'.

As best shown in FIGS. 17 and 18, the ram is supported on arm 100 by a novel ram mounting collar of the invention which includes a unique arrangement which allows freedom of movement of the ram freely in a direction perpendicular to the longitudinal axis of the arm but limits the movement along the longitudinal axis thereof. This unique mounting is accomplished by the use of a mounting pin 142 which passes through an "hour glass" slot 144 formed in ball 133 attached to an end of ram 140. The mounting pin 142 is secured to arm 100 by passing through holes provided in a sleeve 145 suitably affixed to a ring 146 surrounding mounting 130. The ring 146 lies on the upper surface of arm 100 and is attached thereto by any suitable technique such as welding and the like.

The width of the slot 144 in ball 133 is substantially equal to the diameter of pin 142 in a vertical plane and the "hour glass" configuration of slot only allows the ram to move pivotally from a vertical position as shown in FIG. 17 backward in an angular orientation with respect to the arm until the pin contacts face 144' formed in slot 144. From the foregoing it should be apparent that movement of ram 140 around the longitudinal axis of pin 142 is not limited by slot 144. Limited backward movement and unlimited lateral movement of ram is important in the efficient application of force to a vehicle being straightened such as necessitated by the direction of the force desired, the angular position of arm 100 and other factors. A rubber collar 150 having an encapsulated spring 151 urges the ram in vertical upright position as shown in FIGS. 15 and 17 but permits angular movement of the ram when a force is applied to a force transmitting element.

Figure 19:
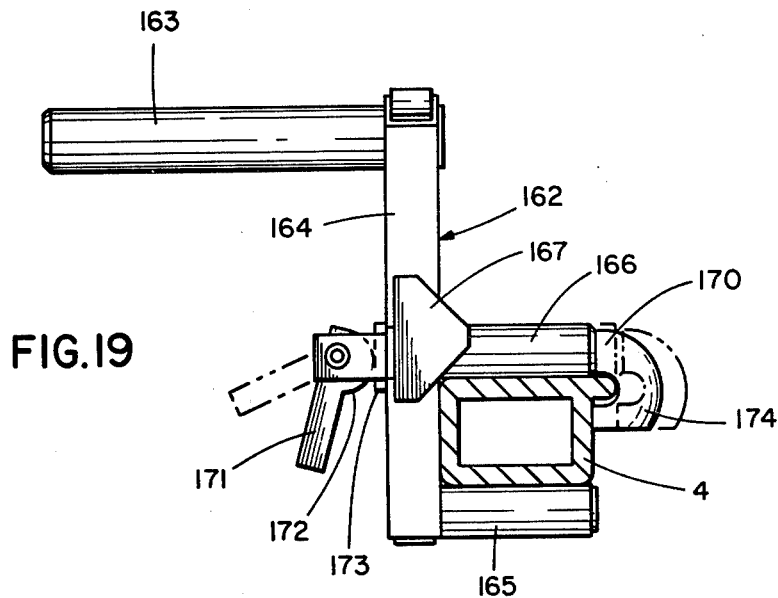
FIG. 19 is a side schematic illustration with parts in section of a vehicle body clamp support taken along lines 19—19 of FIG. 3.
Figure 20:
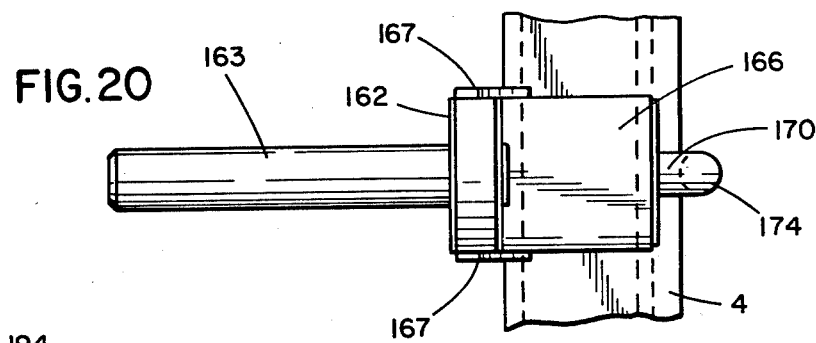
FIG. 20 is a partial top schematic illustration of the body clamp support of FIG. 19.

Referring now to FIGS. 19 and 20, there is illustrated a clamp support device which is utilized to clamp frame 4 of the apparatus of the invention to the body of a vehicle during a straightening and reforming operation. Clamp support device 162 is adapted to be secured to frame 4 of the straightener in a manner similar in function as previously described in securement of the force applying arm to the frame. The clamp support 162 is utilized to support a clamp of any design attachable to the vehicle body (not shown) on a clamp rod 163 which can be either fixed or movable or other suitable element to maintain apparatus 1 in fixed position relative to the vehicle. As shown in FIG. 1 a plurality of clamp supports can be utilized, such as four in number, arranged at selected positions. A clamp body 164 supports rod 162 and also perpendicularly directed lower and intermediate elements 165 and 166. Each of the elements forming body 164, lower element 165 and intermediate element 166 are formed as rectangular tubing being closed at each end.

The elements 165 and 166 are welded to body 164 and a gusset 167 is utilized to rigidize the connection between body 164 and member 166. Holes (not shown) pass through member 164 and an end of intermediate element 166 to receive a hooked end rod 170 for engagement with frame 4 similar as the force arm assembly. The outer end of rod 170 includes a lever 171 having a cam surface 172 adapted to contact a bearing plate 173. In the position shown in FIG. 19 the hook 174 of rod 170 engages frame 4 in a secured manner whereby the upper surface of element 165 and lower surface of element 166 embraces frame 4. To release the support from frame 4, the lever is rotated as shown in phantom in FIG. 19 and the cam surface relieves the bias on the hook 174 and the lever can be rotated around its longitudinal axis for removal of the clamp support. In repairing vehicles it is important that the clamp supports can be positioned at any selected location on frame 4 of the straightening apparatus and such capability is possible in the invention of the application.

Figure 21:
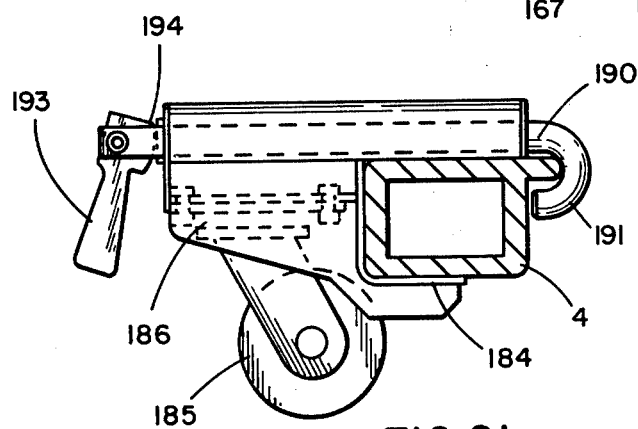
FIG. 21 is a side schematic illustration with parts in section of the frame wheel support taken along lines 21—21 of FIG. 3.
Figure 22:
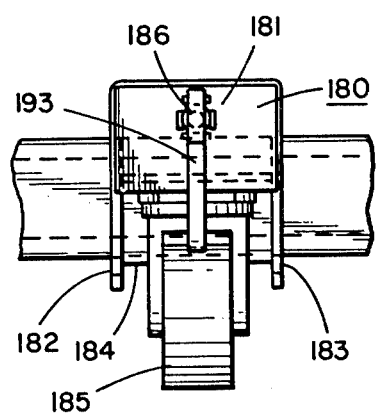
FIG. 22 is an end schematic illustration of the frame wheel support of FIG. 21.

Referring now to FIGS. 21 and 22 there is illustrated the wheel or caster assembly for supporting frame 4 of the straightening apparatus of the invention on a support surface. Although four such caster units are shown in FIGS. 1 and 2, any number of suitable wheel or castor assemblies can be adapted for use with the apparatus of the invention if so desired. The wheel assembly 180 comprises a body 181 having a pair of downwardly extending plates 182 and 183 which are provided with an upper surface 184 to contact the lower surface of frame 4. A suitable wheel or caster 185 is attached to body 181 for rotatable movement around a vertical axis by mounting means 186 which permits the caster to be movable around a vertical axis for convenient manipulation of the frame. The caster assembly is attached at any position on the frame by a mechanism which is similar to that described in connection with the force applying arm and the clamp support. Body 181 is provided with suitable holes to permit the passage of rod 190 having a hook 191 at one end to contact and embrace the flange of frame 4. The other end of the clamp assembly includes a lever 193 and a cam surface 194 to permit the caster to be removably secured to the frame by the technique previously described in connection with the force applying arm and vehicle body clamp support.

The straightener 1 can be positioned relative to a vehicle and operated for straightening in numerous ways dependent on the amounts and areas of deformity of the vehicle and by techniques which experience in operating the straightener have proved successful in actual use. However, in the following description an example of a general technique to operate the apparatus 1 is presented for illustrative purposes.

In operation of the vehicle frame and body straightener of the invention, apparatus 1 is adapted to be positioned beneath an elevated vehicle and a series of body clamps 7 are utilized to secure the vehicle to the frame 4 of the straightener. As has been stated previously, each vehicle model is symmetrically designed with respect to its longitudinal center line with its own unique longitudinal, lateral, and vertical dimensions. Manufacturers of vehicles provide datum holes in vehicle bodies and the correct location of these datum points with respect to the longitudinal center line of the vehicle may be tabulated in data sheets for each model. If a frame or body of a vehicle is deformed, one or more of the datum holes will deviate in one, or more directions, longitudinally, laterally or vertically, and destroy the symmetry of the vehicle.

The particular location of clamps 7, is generally specified in the data sheets for a model vehicle and four such clamps are normally utilized. However, it should be apparent to one skilled in the art that in certain damaged situations of vehicles, it is impossible to utilize four clamps and other numbers of clamps can be more suitable for a straightening operation. Next the measuring bridge 5 is placed on the frame 4 and below the vehicle as illustrated in FIGS. 1 and 2. After the measuring bridge 5 has been positioned under a vehicle, it is necessary for the measuring bridge 5 which is mounted on frame 4 to be properly positioned with respect to the vehicle for proper orientation and calibration. To accomplish this, an operator notes the areas of the vehicle body and frame which have not been deformed and attaches at least three vertical gauges 50 to individual cross slide assemblies or support means 20 and to reference datum points existing in the undamaged areas to function as reference elements.

It should be noted for proper orientation of the measuring bridge its upper surface should lie parallel to the bottom of the vehicle and such parallelism is accomplished by placing one of the three gauges on the opposite side of the longitudinal center line of the vehicle from the others, and adjusting the leveling legs 8 to produce the same vertical indication for all of the gauges. By visually referring to the linear scales provided on tracks 10 or 11, cross tracks 22 or 23 and vertical gauge 50, it may be further appreciated that the measuring bridge may be shifted relative the frame 4 and/or vertically adjusted by levelers 8 to insure the scale readings for a given datum point agree with the dimensional information found in the appropriate data sheet of the vehicle model. After properly orienting the position of the measuring bridge 5 relative to the vehicle, thereby calibrating the bridge so a straightening or reforming operation can be conducted, it is now necessary to attach other vertical gauges 50 supported on individual cross slide assemblies 20 to datum points in damaged or deformed portions of the vehicle.

Since the apparatus has been properly calibrated, the attachment of a vertical gauge 50, as an indicating element to a datum point in the damaged area of the vehicle automatically establishes the actual position of the point relative to the position the datum point would be at if the area was undamaged, which position is indicated vertically by the scale on gauge 50, laterally by the scale on cross slide assembly 20 and longitudinally by the scale on track member 10 or 11. By noting the vehicle model data sheet, it is indicated what the correct position of a particular datum hole should be vertically, longitudinally and laterally with respect to the vehicle center line. The correct position for each datum point can then be set by use of the target indicators or pointers 19', 44 and 64 respectively on tracks 10 or 11, cross slide assembly 20 and gauge 50' and the amount of deviation from the three target indicators pointers from the actual location of the datum hole in the deformed portion of the vehicle can be readily visualized by an operator.

By noting the amount of deviation from each of the three dimensions with respect to the center line, an operator can apply one or more forces through respective pull arms 6 until the damaged area reference datum point of the vehicle in effect is moved horizontally, laterally and vertically an amount necessary to correlate its actual position with the target indicators or pointers. Such convenient measuring is achieved by the invention, since the vertical measuring gauge 50 is vertically extensible and movable laterally and longitudinally of the measuring bridge to response to movement of the datum point. If the plurality of vertical gauges which are attached to the vehicle all indicate that the target pointers are in alignment with the actual position of the datum point in all directions with respect to the horizontal center line, the vehicle is under usual circumstances in a straightened or reformed condition.

In any event, the one or more forces applied by the pulling arm 6 can continuously be made by an operator until such time as the actual position of the datum hole in three directions is in alignment with the target dimension as provided in the data sheet. This provides a simplification and versatility of operation of a vehicle body and frame straightener not heretofore provided in the prior art. Although in the foregoing description, specific numbers of vertical gauges, clamps and the like have been described, it is within the scope of the invention to utilize as many gauges or other elements, perform as many calibration measurements, and perform as many pulling operations as necessary to establish a proper orientation of the measuring bridge and accomplish straightening or reforming of a vehicle frame or body.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A measuring bridge for use in an appliance for straightening and reforming a vehicle for indicating and monitoring the magnitude of correction in the repair of the vehicle, said measuring bridge being supported on a surface below the vehicle and comprising:

a frame, a plurality of cross slide assemblies mounted on said frame for movement in longitudinal and lateral directions, a plurality of vertical gauges mounted on certain of said cross slide assemblies and engageable with datum points on undamaged portions of the vehicle to provide predetermined reference positioning of the measuring bridge with respect to the vehicle, and a plurality of vertical gauges mounted on certain other of said cross slide assemblies and in coupling relationship with datum points on damaged and unaligned portions of the vehicle, said vertical gauges coupled to the damaged portions responding to the application of corrective forces and movable with the cross slide assemblies onto which they are mounted to provide a continuous indication of the magnitude of correction of the vehicle in said longitudinal and lateral directions.

2. The measuring bridge of claim 1, which further includes means disposed between the frame and the cross slide assemblies for positioning the frame and gauges mounted thereon relative the vehicle to calibrate the bridge before repair of the vehicle, said positioning means including means for adjusting said frame and gauges mounted thereon to pre-position the bridge relative the vehicle according to predetermined data.

3. The measuring bridge of claim 1 further comprising target means adjustably positionable relative to said vertical gauges coupled to the damaged portions indicating predetermined positions to which said gauges are to be moved.

4. The measuring bridge of claim 3 wherein each said vertical gauge is extensible in a third direction substantially perpendicular to the plane formed by said two longitudinal and lateral directions.

5. The measuring bridge of claim 4 further including measuring means to indicate the position of a point on said vertical gauge in said third direction.

6. A measuring bridge for use in an apparatus for straightening and reforming a vehicle for indicating and monitoring the magnitude of correction in the repair of the vehicle, said measuring bridge being supported on a surface below the vehicle and comprising:

a plurality of interconnected tracks, a plurality of cross slide assemblies movably mounted on said tracks for longitudinal movement therealong, said assemblies having slide measuring means movably laterally relative said tracks, measuring scales along said tracks for measuring longitudinal movement and along said cross slide assemblies for measuring lateral movement, a plurality of vertical measuring gauges mounted on said slide measuring means of certain of said cross slide assemblies and engageable with datum points on undamaged portions of the vehicle to provide predetermined reference positioning of the measuring bridge with respect to the vehicle, a plurality of vertical measuring gauges mounted on slide measuring means of certain other of said cross slide assemblies and in coupling relationship with datum points on damaged and unaligned portions of the vehicle, said vertical measuring gauges being vertically extensible and having scale means measuring vertical movement and said vertical measuring gauges on said assemblies responding to the application of corrective forces to provide a continuous indication of the magnitude of correction of the vehicle for longitudinal, lateral and vertical movement.

7. The apparatus of claim 6 wherein said vertical gauges include a lower portion and an upper portion positioned in telescopic relationship for relative vertical movement indication.

8. In the apparatus of claim 7 wherein one of said upper portion or said lower portion includes an elongated slot extending vertically, attachment means coupled to the other of said upper portion or said lower portion and to said slot to limit the relative movement thereof.

9. In the apparatus of claim 8 wherein said vertical gauges includes indicators positioned along said slot.

10. In the apparatus of claim 8 wherein said vertical gauges includes resilient means urging movement of said upper portion and said lower portion in opposite directions.

11. The measuring bridge of claim 6, which further includes means disposed between the tracks and the supporting surface for positioning the tracks and elements thereof having means for adjusting the position between the tracks and the supporting surface.

* * * * *